(12) United States Patent
Moravek et al.

(10) Patent No.: US 10,086,950 B1
(45) Date of Patent: Oct. 2, 2018

(54) METHODS AND APPARATUS FOR DIVERTING USER ATTENTION FROM A COMPUTING DEVICE

(71) Applicant: HONEYWELL INTERNATIONAL INC., Morris Plains, NJ (US)

(72) Inventors: Zdenek Moravek, Rozdrojovice (CZ); David Kunes, Tisnov (CZ); Katerina Chmelarova, Hradec Kralove (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/473,966

(22) Filed: Mar. 30, 2017

(51) Int. Cl.
| | |
|---|---|
| G01C 21/00 | (2006.01) |
| B64D 45/00 | (2006.01) |
| G07C 5/08 | (2006.01) |
| G06F 3/147 | (2006.01) |
| H04L 29/08 | (2006.01) |
| G06F 3/01 | (2006.01) |
| G06F 3/041 | (2006.01) |
| G06F 3/0346 | (2013.01) |

(52) U.S. Cl.
CPC ............ B64D 45/00 (2013.01); G06F 3/147 (2013.01); G07C 5/0808 (2013.01); G06F 3/013 (2013.01); G06F 3/0346 (2013.01); G06F 3/041 (2013.01); H04L 67/12 (2013.01)

(58) Field of Classification Search
CPC ......... B64D 45/00; G06F 3/147; G06F 3/013; G06F 3/0346; G06F 3/041; G07C 5/0808; H04L 67/12
USPC .......................... 340/945, 963, 971, 973, 980
See application file for complete search history.

(56) References Cited

U.S. PATENT DOCUMENTS

| | | | | |
|---|---|---|---|---|
| 8,390,440 B2 * | 3/2013 | Krautter | ................ | B60K 35/00 340/435 |
| 8,742,952 B1 * | 6/2014 | Bold | .................... | G08G 5/0078 340/435 |
| 9,457,914 B1 * | 10/2016 | Cline | .................... | B64D 45/00 |
| 2010/0210254 A1 | 8/2010 | Kelly et al. | | |
| 2012/0326855 A1 * | 12/2012 | Bantz | .................... | G07C 5/008 340/439 |

(Continued)

OTHER PUBLICATIONS

Lyden, S.; 6 Mobile Applications to Prevent Distracted Driving Accidens; Automotive Fleet Magazine; http://www.automotivefleet. com/article/story/2011/08/6mobileapplicationstopreventdistracted-drivingaccidents; Aug. 2011.

*Primary Examiner* — Anh V La
(74) *Attorney, Agent, or Firm* — Lorenz & Kopf, LLP (57) ABSTRACT

A method for presenting an alert onboard an aircraft, by a computing device comprising at least system memory, a processor, and a plurality of sensors, is provided. The method identifies a status of the aircraft, by the processor, from a plurality of avionics communicatively coupled to the computing device via a wireless data connection; determines that attention of a flight crew member is required by one of the plurality of avionics, based on the status; determines that the computing device is in a state of current use, based on user input data received by the plurality of sensors; and presents an alert associated with the status and the one of the plurality of avionics, via a display device communicatively coupled to the processor, wherein the alert comprises an indication to direct the attention toward the one of the plurality of avionics and details associated with the status.

18 Claims, 6 Drawing Sheets

(56) References Cited

U.S. PATENT DOCUMENTS

| | | | |
|---|---|---|---|
| 2014/0045477 A1* | 2/2014 | Ewell, Jr. | H04W 4/027 455/418 |
| 2015/0348513 A1 | 12/2015 | Grimme et al. | |
| 2016/0282937 A1* | 9/2016 | Thorn | G06T 17/00 |

* cited by examiner

METHODS AND APPARATUS FOR DIVERTING USER ATTENTION FROM A COMPUTING DEVICE

TECHNICAL FIELD

Embodiments of the subject matter described herein relate generally to presenting an alert, by a computing device, to divert user attention to another system. More particularly, embodiments relate to presenting the alert in scenarios where user attention is required by a system that is separate and distinct from the computing device.

BACKGROUND

A personal computing device may occupy the attention of a user, and by its use inherently distract the user from other tasks. In certain circumstances, tasks that are separate and distinct from the personal computing device are important, high-priority, or urgent, and in certain situations, use of the personal computing device can distract from such an attention-requiring situation. In the context of aircraft operation, flight crew members often use personal computing devices onboard an aircraft in the context of Electronic Flight Bag (EFB) applications. Aircraft operation or flight tasks may require user attention when a flight crew member is actively operating an EFB application associated with a different task, thus diverting user attention.

Accordingly, it is desirable to facilitate user completion of attention-requiring tasks in the context of a current situation. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for presenting an alert onboard an aircraft, by a computing device comprising at least a system memory element, a processor, and a plurality of sensors. The method identifies a status of the aircraft, by the processor, from a plurality of avionics communicatively coupled to the computing device via a wireless data connection; determines that attention of a flight crew member is required by one of the plurality of avionics, based on the status of the aircraft; determines that the computing device is in a state of current use, based on user input data received by the plurality of sensors; and presents an alert associated with the status and the one of the plurality of avionics, via a display device communicatively coupled to the processor, wherein the alert comprises an indication to direct the attention toward the one of the plurality of avionics and details associated with the status.

Some embodiments of the present disclosure provide a computing device, which includes a system memory element; a communication device, configured to establish a communication connection to a plurality of avionics onboard an aircraft and to receive avionics data via the communication connection; a plurality of sensors, configured to receive user input data indicating use of the computing device; a display device, configured to present user alerts comprising at least one of graphical elements and text; and at least one processor, communicatively coupled to the system memory element, the communication device, the plurality of sensors, and the display device, the at least one processor configured to: identify a status of the aircraft, based on continuously monitoring the plurality of avionics communicatively coupled to the computing device via the communication device; determine that attention of a flight crew member is required by one of the plurality of avionics, based on the status of the aircraft; determine that the computing device is in a state of current use, based on the user input data received by the plurality of sensors; and present an alert associated with the status and the one of the plurality of avionics, via the display device, wherein the alert comprises an indication to direct the attention toward the one of the plurality of avionics and details associated with the status.

Some embodiments of the present disclosure provide a non-transitory, computer-readable medium containing instructions thereon, which, when executed by a processor, perform a method. The method detects, by the processor, current use of a mobile computing device by a user; assesses situational context based on situation data obtained via one or more electronic devices communicatively coupled to the processor; and when the situational context indicates a user attention requirement separate from the computing device, presents an alert onscreen.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and apparatus for alerting a user of a computing device to a situation requiring attention, wherein the situation is separate and distinct from the computing device itself. More specifically, the subject matter relates to detecting active use of a personal computing device, identifying current situational context, determining whether the current situational context indicates that another system (apart from the computing device) requires the user's attention, and, if so, presenting an alert directing the user to the system requiring attention.

Certain terminologies are used with regard to the various embodiments of the present disclosure. The terms status, condition, and state are used interchangeably herein. An aircraft status, condition, or state requiring user attention may include any situation involving operation of one or more avionics systems or devices for which user monitoring is required and/or for which user intervention is required in order to continue operating the aircraft safely and in accordance with a current flight plan. An aircraft status, condition, or state requiring user attention may be referred to as a high-priority situation or a critical situation onboard the aircraft. The status of the aircraft may include a status of one or more aircraft onboard avionics systems, which affects the overall status of the aircraft during operation of the aircraft and/or during flight of the aircraft.

Figure 1:
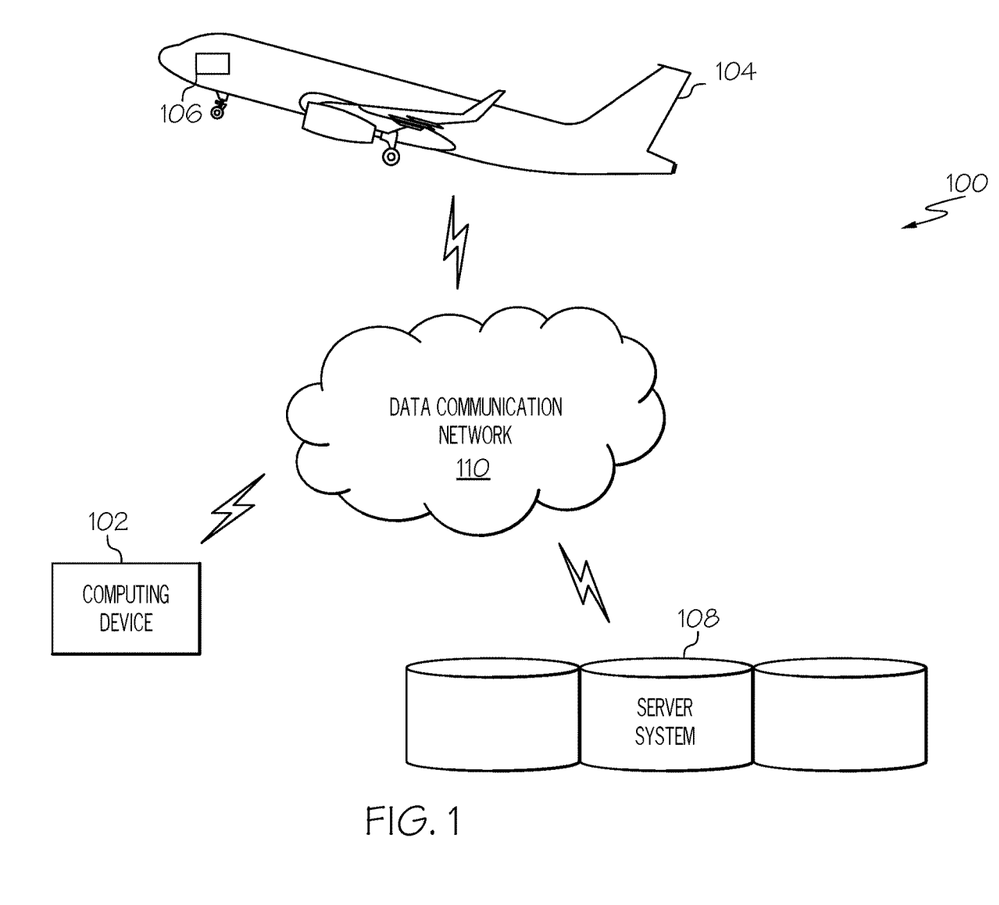
FIG. 1 is a diagram of a system for user attention management, in accordance with the disclosed embodiments.

Turning now to the figures, FIG. 1 is a diagram of a user attention management system 100, in accordance with the disclosed embodiments. The user attention management system 100 operates onboard an aircraft 104 during flight to notify a user that is occupied with a computing device 102 of a high-priority or critical situation requiring user attention, wherein the critical situation is separate and distinct from the computing device 102. The user attention management system 100 may include, without limitation, a computing device 102 that communicates with one or more avionics systems 106 onboard the aircraft 104 and at least one server system 108, via a data communication network 110. In practice, certain embodiments of the user attention management system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing an Electronic Flight Bag (EFB) application configured to determine and present alerts associated with critical flight situations when the user is occupied with the computing device 102. In other embodiments, the computing device 102 may be implemented using a computer system onboard the aircraft 104, which is configured to determine that the user is occupied with a personal computing device 102 and present alerts associated with a current critical flight situation requiring user attention.

The aircraft 104 may be implemented as an airplane, helicopter, spacecraft, hovercraft, or the like. The one or more avionics systems 106 may include a Flight Management System (FMS), navigation devices, weather detection devices, radar devices, communication devices, brake systems, and/or any other electronic system or avionics system used to operate the aircraft 104. Data obtained from the one or more avionics systems 106 may include, without limitation: flight data, aircraft heading, aircraft speed, aircraft position, altitude, descent rate, position of air spaces surrounding a current flight plan, activity of air spaces surrounding a current flight plan, or the like.

The server system 108 may include any number of application servers, and each server may be implemented using any suitable computer. In some embodiments, the server system 108 includes one or more dedicated computers. In some embodiments, the server system 108 includes one or more computers carrying out other functionality in addition to server operations. The server system 108 may store and provide any type of data used to identify a critical or high-priority flight situation that requires user attention. Such data may include, without limitation: flight plan data, aircraft parameters, avionics data and associated user actions, and other data compatible with the computing device 200.

The computing device 102 is usually located onboard the aircraft 104, and the computing device 102 communicates with the one or more avionics systems 106 via wired and/or wireless communication connection. The computing device 102 and the server system 108 may both be located onboard the aircraft 104. In other embodiments, the computing device 102 and the server system 108 may be disparately located, and the computing device 102 communicates with the server system 108 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network, such as a cellular communications network for communicating with mobile phones, personal digital assistants, and/or the like. The data communication network 110 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the user attention management system 100 functions to prevent flight crew member distraction onboard the aircraft 104. As described herein, flight crew member distraction is when the flight crew of the aircraft 104 has directed his attention toward the computing device 102 when a critical flight situation involving one or more avionics systems 106 is occurring. Flight crew member distraction is determined because the computing device 102 is in use by a flight crew member onboard the aircraft 104. The active computing device 102 obtains relevant aircraft parameter data and avionics systems status data from the one or more avionics systems 106 and identifies a current flight situation based on the aircraft parameters and avionics systems status data. The computing device 102 then compares the current flight situation to the contents of a stored database of predefined critical situations and associated user attention requirements (e.g., user monitoring and/or user interventions associated with predefined critical situations) to determine whether the current flight situation is a critical situation that requires user attention. The database may be stored internally by the computing device 102 or by the server system 108 located onboard the aircraft 104 or in a disparate location. When the current flight situation is a critical situation that requires user attention, the computing device 102 alerts the user, thus providing information for a device and/or location requiring user attention.

Figure 2:
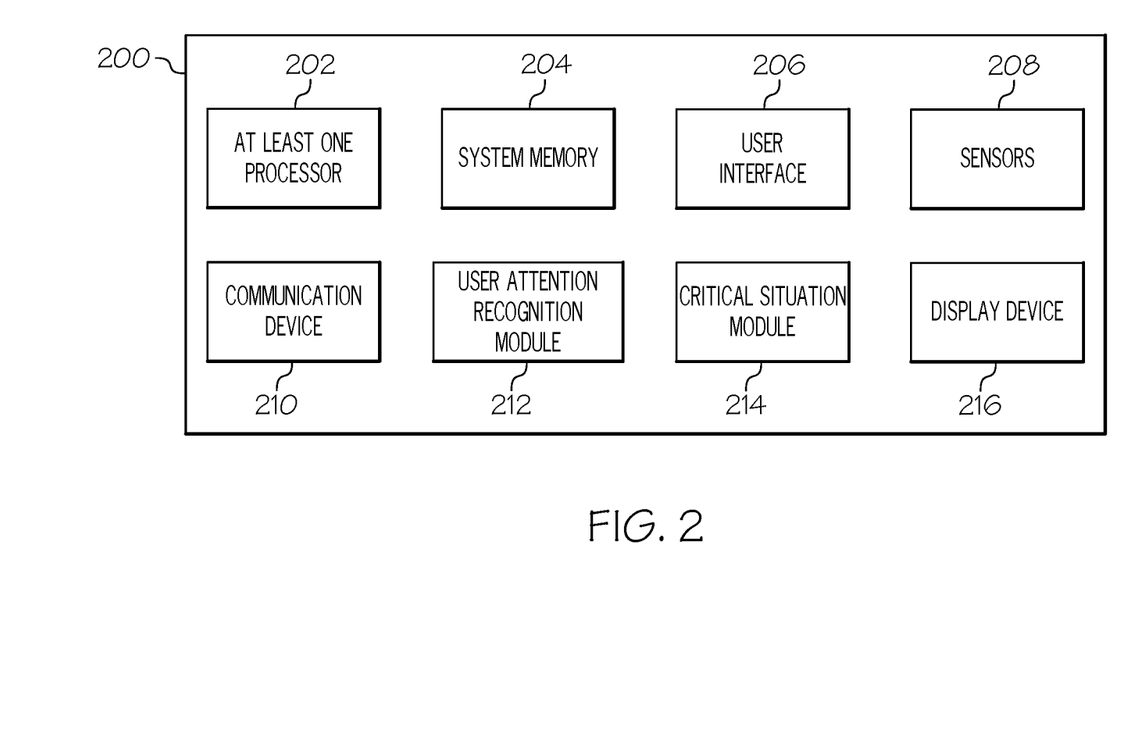
FIG. 2 is a functional block diagram of a computing device, in accordance with the disclosed embodiments.

FIG. 2 is a functional block diagram of a computing device 200, in accordance with the disclosed embodiments. It should be noted that the computing device 200 can be implemented with the computing device 102 depicted in FIG. 1. In this regard, the computing device 200 shows certain elements and components of the computing device 102 in more detail.

The computing device 200 generally includes, without limitation: at least one processor 202; system memory 204; a user interface 206; a plurality of sensors 208; a communication device 210; a user attention recognition module 212; a critical situation module 214; and a display device 216. These elements and features of the computing device 200 may be operatively associated with one another, coupled to one another, or otherwise configured to cooperate with one another as needed to support the desired functionality—in particular, dynamically providing user alerts to redirect user attention onboard an aircraft during flight, as described herein. For ease of illustration and clarity, the various physical, electrical, and logical couplings and interconnections for these elements and features are not depicted in FIG. 2. Moreover, it should be appreciated that embodiments of the computing device 200 will include other elements, modules, and features that cooperate to support the desired functionality. For simplicity, FIG. 2 only depicts certain elements that relate to the alert-generating techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to the system memory 204. The system memory 204 is configured to store any obtained or generated data associated with generating alerts to redirect user attention from the computing device 200 to a critical or high-priority flight situation. The system memory 204 may be realized using any number of devices, components, or modules, as appropriate to the embodiment. Moreover, the computing device 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the computing device 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the computing device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 200. For example, the user interface 206 could be manipulated by an operator to provide flight data parameters during the operation of electronic flight bag (EFB) applications, as described herein.

In certain embodiments, the user interface 206 may include or cooperate with various features to allow a user to interact with the computing device 200 via graphical elements rendered on a display element (e.g., the display device 216). Accordingly, the user interface 206 may initiate the creation, maintenance, and presentation of a graphical user interface (GUI). In certain embodiments, the display device 216 implements touch-sensitive technology for purposes of interacting with the GUI. Thus, a user can manipulate the GUI by moving a cursor symbol rendered on the display device 216, or by physically interacting with the display device 216 itself for recognition and interpretation, via the user interface 206.

The plurality of sensors 208 is configured to obtain data associated with active use of the computing device 200, and may include, without limitation: eye-tracking sensors and/or gaze-tracking sensors, touchscreen sensors, accelerometers, gyroscopes, or the like. Some embodiments of the computing device 200 may include one particular type of sensor, and some embodiments may include a combination of different types of sensors. Generally, the plurality of sensors 208 provides data indicating whether the computing device 200 is currently being used. In this way, eye-tracking or gaze-tracking sensors indicate whether a user has directed his gaze toward the computing device 200 (indicating active use of the computing device 200) or the user has directed his gaze away from the computing device 200 (indicating that the user is not actively using the computing device 200). Touchscreen sensors may provide output affirming that the user is currently making physical contact with the touchscreen (e.g., a user interface 206 and/or display device 216 of the computing device 200), indicating active use of the computing device. Accelerometers and/or gyroscopes may provide output affirming that the computing device 200 is in motion, indicating active use of the computing device 200.

The communication device 210 is suitably configured to communicate data between the computing device 200 and one or more remote servers and one or more avionics systems onboard an aircraft. The communication device 210 may transmit and receive communications over a wireless local area network (WLAN), the Internet, a satellite uplink/downlink, a cellular network, a broadband network, a wide area network, or the like. As described in more detail below, data received by the communication device 210 may include, without limitation: avionics systems data and aircraft parameters (e.g., a heading for the aircraft, aircraft speed, altitude, aircraft position, ascent rate, descent rate, a current flight plan, a position of air spaces around a current flight plan, and activity of the air spaces around a current flight plan), and other data compatible with the computing device 200. Data provided by the communication device 210 may include, without limitation, requests for avionics systems data, alerts and associated detail for display via an aircraft onboard display, and the like.

The user attention recognition module 212 is suitably configured to determine whether a user is directing his attention toward the computing device 200, or in other words, whether the user is distracted from a current situation by current operation of the computing device 200. The user attention recognition module 212 obtains sensor data, via the plurality of sensors 208, to determine whether the user is actively using the computing device 200. As described previously with regard to the plurality of sensors 208, the user attention recognition module 212 may use eye-tracking or gaze-tracking sensors to determine whether a user has directed his gaze toward the computing device 200 (indicating active use of the computing device 200) or the user has directed his gaze away from the computing device 200 (indicating that the user is not actively using the computing device 200). The user attention recognition module 212 may use touchscreen sensors to determine whether the user is currently making physical contact with the touchscreen (e.g., a user interface 206 and/or display device 216 of the computing device 200), indicating active use of the computing device. The user attention recognition module 212 may use accelerometers and/or gyroscopes may provide output affirming that the computing device 200 is in motion, indicating active use of the computing device 200.

The critical situation module 214 obtains avionics data, via the communication device 210, to identify a current situation of the aircraft. Once the current situation is identified, the critical situation module 214 determines whether the current situation is a critical or high-priority situation that requires user attention. The critical situation module 214 evaluates the current aircraft condition and predicts the development and progression of the current aircraft condition. The current aircraft condition may require immediate action (e.g., aircraft has entered a reserved area or crew-alerting system (CAS) has issued an alert), or extrapolating the aircraft condition reveals a need for an action (e.g., given aircraft descent rate and selected altitude system, the critical situation module 214 predicts when pilots are required to intervene to control smooth acquisition of the altitude).

The critical situation module 214 generally determines whether the current situation is a critical situation requiring user attention by comparing the current situation data to a database of predefined critical situations requiring user attention to locate a match. The critical situation module 214 accesses the database of predefined critical situations by accessing system memory 204 and/or communicating with a server via the communication device 210. The database of predefined critical situations includes limits on aircraft conditions and recommended user actions for pre-selected situations. For example, when the aircraft is in descent, the altitude and selected altitude of the aircraft become critical when the difference between altitude and selected altitude is less than 1000 feet. In this scenario, the pilot is then informed to monitor the primary flight display (PFD) onboard the aircraft.

In practice, the user attention recognition module 212 and/or the critical situation module 214 may be implemented with (or cooperate with) the at least one processor 202 to perform at least some of the functions and operations described in more detail herein. In this regard, the user attention recognition module 212 and/or the critical situation module 214 may be realized as suitably written processing logic, application program code, or the like.

The display device 216 is configured to display various icons, text, and/or graphical elements associated with alerts related to situations requiring user attention, wherein the situations are associated with a device or system that is separate and distinct from the computing device 200. In an exemplary embodiment, the display device 216 and the user interface 206 are communicatively coupled to the at least one processor 202. The at least one processor 202, the user interface 206, and the display device 216 are cooperatively configured to display, render, or otherwise convey one or more graphical representations or images associated with high-priority or critical flight situation alerts on the display device 216, as described in greater detail below. In an exemplary embodiment, the display device 216 is realized as an electronic display configured to graphically display critical flight situation alerts and associated detail, as described herein. In some embodiments, the computing device 200 is an integrated computer system onboard an aircraft, and the display device 216 is located within a cockpit of the aircraft, and is thus implemented as an aircraft display. In other embodiments, the display device 216 is implemented as a display screen of a standalone, personal computing device (e.g., laptop computer, tablet computer). It will be appreciated that although the display device 216 may be implemented using a single display, certain embodiments may use additional displays (i.e., a plurality of displays) to accomplish the functionality of the display device 216 described herein.

Figure 3:
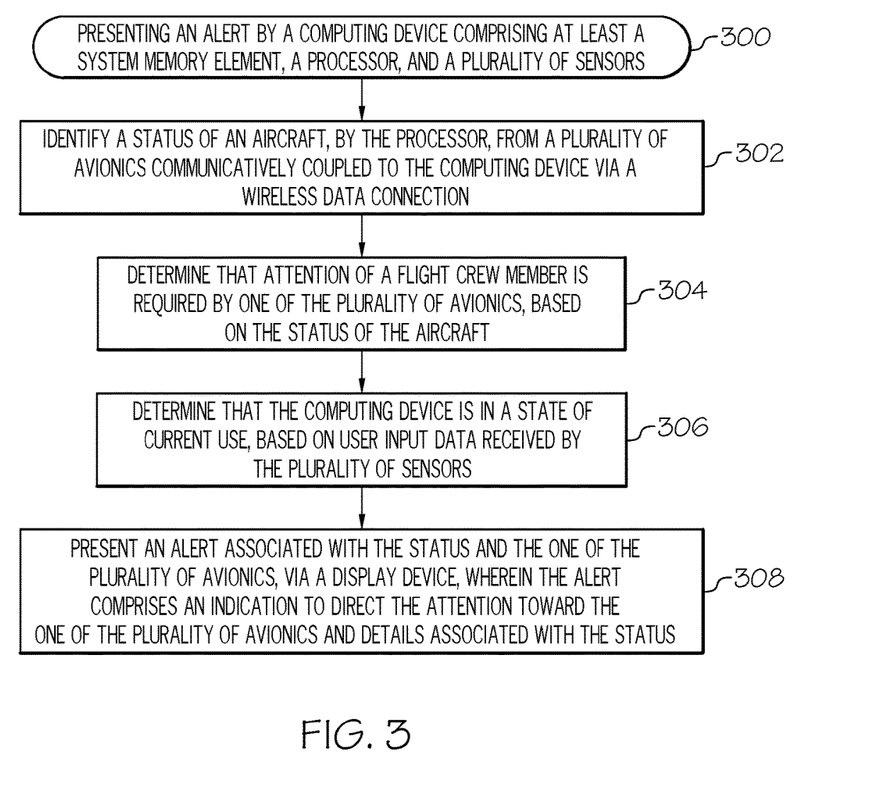
FIG. 3 is a flow chart that illustrates an embodiment of a process for presenting an alert by a computing device, in accordance with the disclosed embodiments.

FIG. 3 is a flow chart that illustrates an embodiment of a process 300 for presenting an alert onboard an aircraft, by a computing device, in accordance with the disclosed embodiments. First, the process 300 identifies a status of an aircraft, by the processor, from a plurality of avionics communicatively coupled to the computing device via a wireless data connection (step 302). The process 300 may obtain any applicable aircraft parameters and/or avionic system output data that indicates a status of the aircraft. For example, the process 300 may obtain parameters including, without limitation: a heading for the aircraft, aircraft speed, altitude, aircraft position, ascent rate, descent rate, a current flight plan, a position of air spaces around a current flight plan, and activity of the air spaces around a current flight plan. The aforementioned parameters, without limitation, may be obtained from one or more avionics systems onboard the aircraft. In some embodiments, the process 300 establishes a communication connection to a data bus communicatively coupled to each of the plurality of avionics, retrieves avionics data associated with the status of the aircraft, via the communication connection, and determines that the attention of the flight crew member is required, based on the avionics data. In some embodiments, the process 300 obtains aircraft parameters and/or avionics system output data continuously throughout a current flight or continuously throughout operation of the aircraft. Here, the process 300 continuously monitors the plurality of avionics, via the communication device, by continuously retrieving updated avionics data throughout a flight, and continuously identifies the status of the aircraft, by the processor, based on continuously monitoring the plurality of avionics.

The status of the aircraft may include a status of one or more aircraft onboard avionics systems, which affects the overall status of the aircraft during operation of the aircraft and/or during flight of the aircraft. There may exist a condition or state of an avionics system in the cockpit wherein under that condition the pilot is required to monitor and/or manually intervene to change a particular parameter. As one example, if the aircraft is automatically ascending or descending and the aircraft changes altitude, then a flight crew member may be required to monitor the primary flight display (PFD) onboard the aircraft. Here, the condition, state, or status of the aircraft is that of automatically descending or ascending, and due to the automatically descending or ascending condition, the flight crew is required to monitor the condition via the primary flight display (PFD). As another example, if the aircraft is in-flight according to a current flight plan, the condition, state, or status may be a current location of the aircraft, as detected by an onboard Global Positioning Service (GPS) device, when the aircraft reaches a GPS location that is too close to a geographic area that is prohibited for the aircraft. In this example, the flight crew may be required to monitor the GPS and potentially intervene to make changes to the course that the aircraft is flying.

The process 300 then determines that attention of a flight crew member is required by one of the plurality of avionics, based on the status of the aircraft (step 304). One suitable methodology for determining that attention of a flight crew member is required by one of the plurality of avionics is described below with reference to FIG. 5. Here, the process 300 determines that an avionics system onboard the aircraft needs some type of user intervention or user input to proceed to operate the aircraft in a safe and effective manner to ensure that the aircraft reaches a planned destination safely.

The process 300 also determines that the computing device is in a state of current use, based on user input data received by a plurality of sensors, wherein the computing device comprises at least a system memory element, a processor, and the plurality of sensors (step 306). Suitable methodologies for determining that that the computing device is in a state of current use are described below with reference to FIGS. 6-8. Here, the process 300 uses built-in sensors of the computing device, including gaze-direction sensors, touchscreen sensors, accelerometers, and/or gyroscopes, to determine that a user is currently using, and therefore directing attention to, the computing device.

The process 300 then presents an alert associated with the status and the one of the plurality of avionics, via a display device, wherein the alert comprises an indication to direct the attention toward the one of the plurality of avionics and details associated with the status (step 308). The alert may include a description of the status of the aircraft and the associated avionics systems, one or more required user actions (e.g., user monitoring and/or user intervention), and the like. In certain embodiments, the process 300 presents the alert using a display element of the computing device. In some embodiments, the process 300 presents the alert using more than one display device. In this case, the process 300 may present the alert using a display element of the computing device and one or more aircraft onboard displays.

Figure 4:
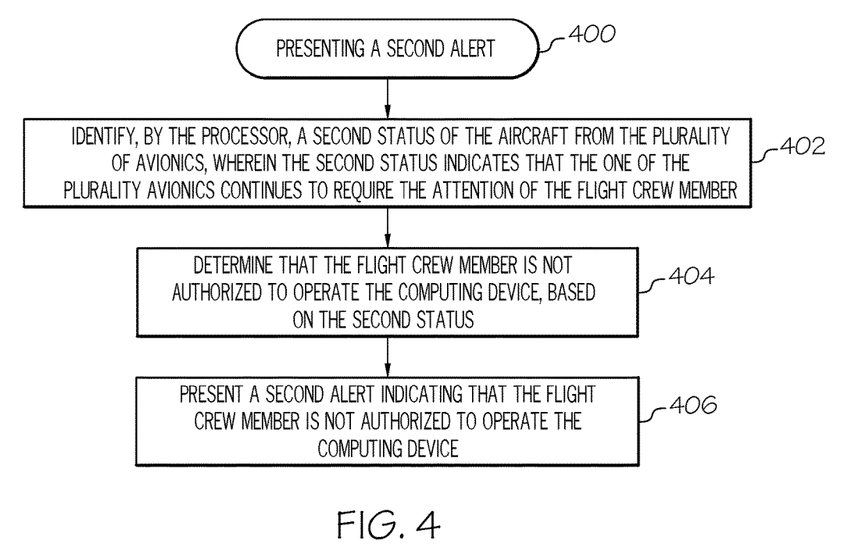
FIG. 4 is a flow chart that illustrates an embodiment of a process for presenting a second alert, in accordance with the disclosed embodiments.

FIG. 4 is a flow chart that illustrates an embodiment of a process 400 for presenting a second alert, in accordance with the disclosed embodiments.

First, the process 400 identifies, by the processor, a second status of the aircraft from the plurality of avionics, wherein the second status indicates that the one of the plurality of avionics continues to require the attention of the flight crew member (step 402). The process 400 includes an attention recognition module, aircraft data, and critical situation module. The attention recognition module confirms that the flight crew member continues using the computing device despite the first alert. The critical situation module evaluates aircraft data to confirm that no intervention has been completed to mitigate the critical situation. For example, when the first alert notifies the flight crew member that an aircraft heading requires user intervention, and the process 400 (1) determines that the heading of aircraft has not been changed, and (2) confirms that the critical situation is continuing.

The process 400 then determines that the flight crew member is not authorized to operate the computing device, based on the second status (step 404). When the flight crew member has addressed the critical situation indicated by the first alert, then continued use of the computing device is permitted. However, when the flight crew member has not addressed the critical situation indicated by the first alert, then continued use of the computing device is not permitted.

Here, when the flight crew member is not authorized to operate the computing device, the process 400 presents a second alert indicating that the flight crew member is not authorized to operate the computing device (step 406). The process 400 presents the second alert when the attention recognition module detects that the flight crew member (i.e., the user of the computing device) has not properly reacted to the presented first alert. The attention recognition module uses the same means as for issuing the first alert, but the form of the second alert differs typically being more salient. The second alert and the first alert may be presented simultaneously and/or in succession. Exemplary embodiments of the process 400 present the second alert using a display element of the computing device and, in some embodiments, the process 400 presents the second alert using one or more aircraft onboard displays in addition to the display element of the computing device.

Figure 5:
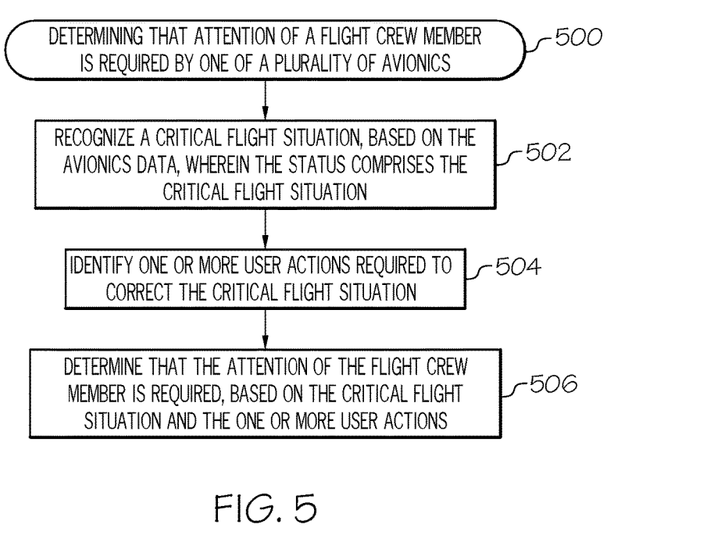
FIG. 5 is a flow chart that illustrates an embodiment of a process for determining that attention of a flight crew member is required by one of a plurality of avionics, in accordance with the disclosed embodiments.

FIG. 5 is a flow chart that illustrates an embodiment of a process 500 for determining that attention of a flight crew member is required by one of a plurality of avionics, in accordance with the disclosed embodiments. It should be appreciated that the process 500 described in FIG. 5 represents one embodiment of step 304 described above in the discussion of FIG. 3, including additional detail. First, the process 500 recognizes a critical flight situation, based on the avionics data, wherein the status comprises the critical flight situation (step 502). A critical flight situation may include any flight situation (i.e., condition, status, or state occurring during flight) requiring user monitoring and/or user intervention to continue operating the aircraft in such a way as to successfully and safely reach a destination.

The process 500 also identifies one or more user actions required to correct the critical flight situation (step 504), and then determines that the attention of the flight crew member is required, based on the critical flight situation and the one or more user actions (step 506). Here, the process 500 accesses a database of predefined aircraft conditions, states, or statuses, and compares the critical flight situation to the database to identify a current situation which requires user attention and potential intervention. Such a database includes at least a predefined list of statuses and corresponding required user actions (e.g., user monitoring and/or user intervention). When the detected critical flight situation matches a status listed in the database, then the process 500 determines that the attention of a flight crew member is required by one of the plurality of avionics, as defined by the status listed in the database.

Figure 6:
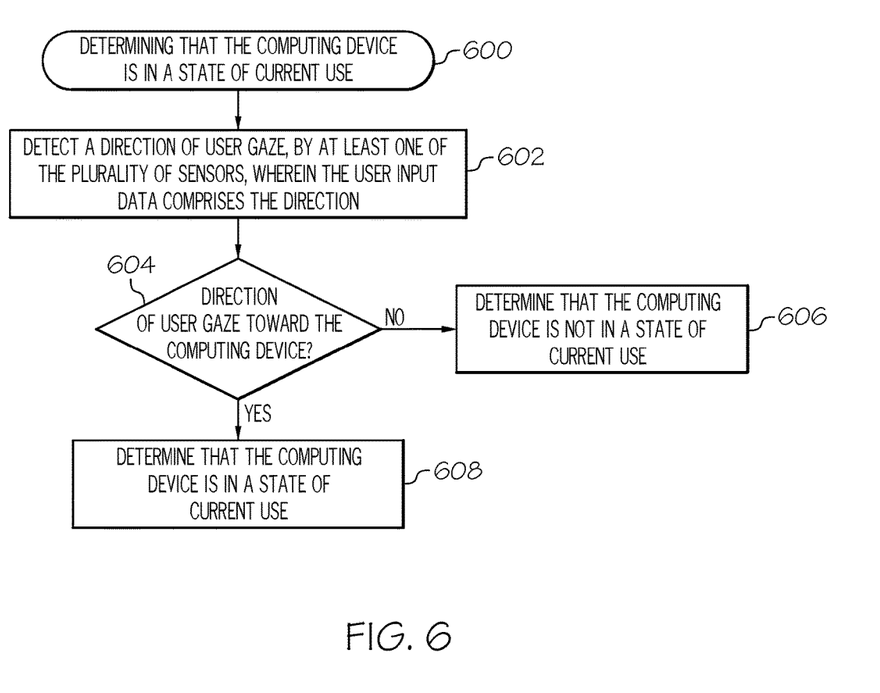
FIG. 6 is a flow chart that illustrates an embodiment of a process for determining that the computing device is in a state of current use, in accordance with the disclosed embodiments.

FIG. 6 is a flow chart that illustrates an embodiment of a process for determining that the computing device is in a state of current use, in accordance with the disclosed embodiments. It should be appreciated that the process 600 described in FIG. 6 represents one embodiment of step 306 described above in the discussion of FIG. 3, including additional detail. First, the process 600 detects a direction of user gaze, by at least one of the plurality of sensors, wherein the user input data comprises the direction (step 602). To detect the direction of user gaze, the process 600 uses well-known, commonly used, and widely-available technology, which will not be described in detail here. Generally, the process 600 obtains gaze direction data using eye-tracking or gaze-tracking sensors integrated as part of the computing device.

Next, the process 600 determines whether the direction of the user gaze is toward the computing device (decision 604). The process 600 uses eye-tracking or gaze-tracking sensors with the capability of determining whether the user gaze is (i) toward the computing device or (ii) away from the computing device. Here, the process 600 identifies the direction of the user gaze using output from the eye-tracking or gaze-tracking sensors.

When the direction of the user gaze is not toward the computing device (the "No" branch of 604), then the process 600 determines that the computing device is not in a state of current use (step 606). However, when the direction of the user gaze is directed toward the computing device (the "Yes" branch of 604), then the process 600 determines that the computing device is in a state of current use (step 608). Once it has been determined that user attention is required by one of the plurality of avionics (see FIG. 3) and the computing device is in a state of current use, embodiments of the present disclosure present an alert to notify the user that the user should direct his attention away from the computing device and toward the avionics system requiring attention.

Figure 7:
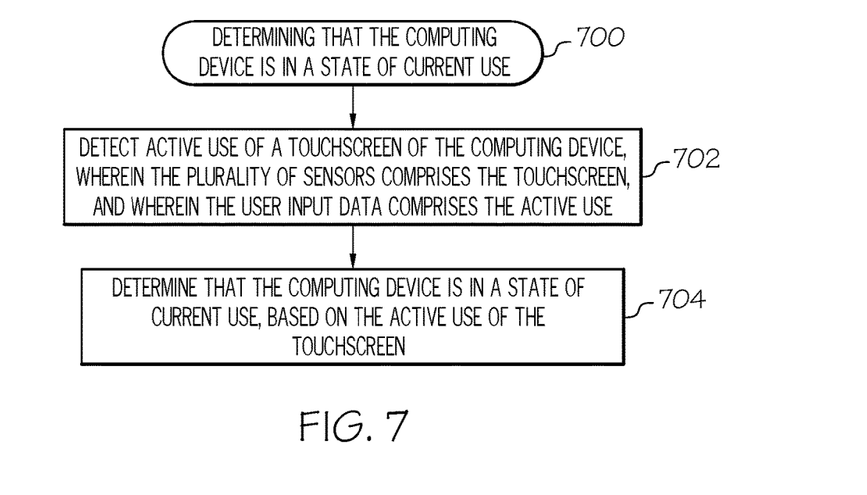
FIG. 7 is a flow chart that illustrates a second embodiment of a process for determining that the computing device is in a state of current use, in accordance with the disclosed embodiments.

FIG. 7 is a flow chart that illustrates a second embodiment of a process 700 for determining that the computing device is in a state of current use, in accordance with the disclosed embodiments. It should be appreciated that the process 700 described in FIG. 7 represents one embodiment of step 306 described above in the discussion of FIG. 3, including additional detail. First, the process 700 detects active use of a touchscreen of the computing device, wherein the plurality of sensors comprises the touchscreen, and wherein the user input data comprises the active use (step 702).

The process 700 then determines that the computing device is in a state of current use, based on the active use of the touchscreen (step 704). Once it has been determined that user attention is required by one of the plurality of avionics (see FIG. 3) and the computing device is in a state of current use, embodiments of the present disclosure present an alert to notify the user that the user should direct his attention away from the computing device and toward the avionics system requiring attention. Active use of the touchscreen includes individual touch events. For example, a user may touch the display and invoke a display response; a user may perform a touch gesture, wherein the user moves fingers along the display; and a user may also provide input via supplementary devices such as mouse, track-ball or keyboard.

Figure 8:
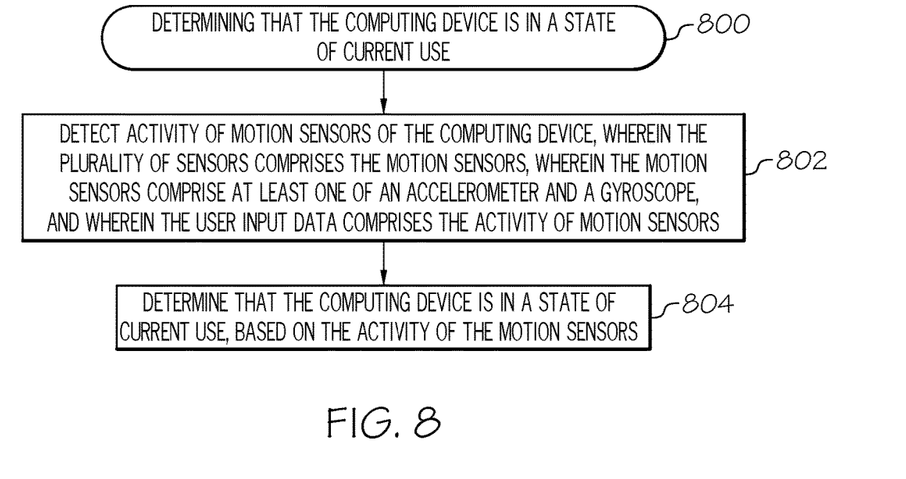
FIG. 8 is a flow chart that illustrates a third embodiment of a process for determining that the computing device is in a state of current use, in accordance with the disclosed embodiments.

FIG. 8 is a flow chart that illustrates a third embodiment of a process 800 for determining that the computing device is in a state of current use, in accordance with the disclosed embodiments. It should be appreciated that the process 800 described in FIG. 8 represents one embodiment of step 306 described above in the discussion of FIG. 3, including additional detail. First, the process 800 detects activity of motion sensors of the computing device, wherein the plurality of sensors comprises the motion sensors, wherein the motion sensors comprise at least one of an accelerometer and a gyroscope, and wherein the user input data comprises the activity of the motion sensors (step 802).

Next, the process 800 determines that the computing device is in a state of current use, based on the activity of motion sensors (step 804). Once it has been determined that user attention is required by one of the plurality of avionics (see FIG. 3) and the computing device is in a state of current use, embodiments of the present disclosure present an alert to notify the user that the user should direct his attention away from the computing device and toward the avionics system requiring attention. Additionally, the interpretation of data from the motion sensors also permits identification of user in terms of whether the user is seated on left or right side. An algorithm for identification tracks relative movement of the motion sensors with respect to the pre-defined neutral position of the device.

The various tasks performed in connection with processes 300-800 may be performed by software, hardware, firmware, or any combination thereof. For illustrative purposes, the preceding description of processes 300-800 may refer to elements mentioned above in connection with FIGS. 1-2. In practice, portions of processes 300-800 may be performed by different elements of the described system. It should be appreciated that processes 300-800 may include any number of additional or alternative tasks, the tasks shown in FIGS. 3-8 need not be performed in the illustrated order, and processes 300-800 may be incorporated into a more comprehensive procedure or process having additional functionality not described in detail herein. Moreover, one or more of the tasks shown in FIGS. 3-8 could be omitted from embodiments of the processes 300-800 as long as the intended overall functionality remains intact. Additionally, processes 300-800 can be used independently or in combination to improve quality of state and situation assessment.

As an example of state assessment from combination of processes 300-800, the user of computing device can be identified with respect to be seated on left or right side and also with respect to his role in the cockpit. An identification algorithm relative movement of the motion sensors and data from video sensor in order to locate the user in the cockpit environment. The information is provided to critical situation module to assess whether the specific user can use the computing device (e.g., a driver in a car should not use phone while driving).

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for presenting an alert onboard an aircraft, by a computing device comprising at least a system memory element, a processor, and a plurality of sensors, the method comprising:

identifying a status of the aircraft, by the processor, from a plurality of avionics communicatively coupled to the computing device via a wireless data connection;

determining that attention of a flight crew member is required by one of the plurality of avionics, based on the status of the aircraft;

determining that the computing device is in a state of current use, based on user input data received by the plurality of sensors;

presenting an alert associated with the status and the one of the plurality of avionics, via a display device communicatively coupled to the processor, wherein the alert comprises an indication to direct the attention toward the one of the plurality of avionics and details associated with the status;

identifying, by the processor, a second status of the aircraft from the plurality of avionics, wherein the second status indicates that the one of the plurality of avionics continues to require the attention of the flight crew member;

determining that the flight crew member is not authorized to operate the computing device, based on the second status; and presenting a second alert indicating that the flight crew member is not authorized to operate the computing device.

2. The method of claim 1, further comprising:

establishing a communication connection to a data bus communicatively coupled to each of the plurality of avionics;

retrieving avionics data associated with the status of the aircraft, via the communication connection; and determining that the attention of the flight crew member is required, based on the avionics data.

3. The method of claim 2, further comprising:

continuously monitoring the plurality of avionics, via the communication device, by continuously retrieving updated avionics data throughout a flight; and continuously identifying the status of the aircraft, by the processor, based on continuously monitoring the plurality of avionics.

4. The method of claim 2, wherein determining that attention of the flight crew member is required, further comprises:

recognizing a critical flight situation, based on the avionics data, wherein the status comprises the critical flight situation;

identifying one or more user actions required to correct the critical flight situation; and determining the attention of the flight crew member is required, based on the critical flight situation and the one or more user actions.

5. The method of claim 1, wherein determining that the computing device is in a state of current use, further comprises:

detecting a direction of user gaze, by at least one of the plurality of sensors, wherein the user input data comprises the direction; and when the direction of the user gaze is directed toward the computing device, determining that the computing device is in a state of current use.

6. The method of claim 1, wherein determining that the computing device is in a state of current use, further comprises:

detecting active use of a touchscreen of the computing device, wherein the plurality of sensors comprises the touchscreen, and wherein the user input data comprises the active use; and determining that the computing device is in a state of current use, based on the active use of the touchscreen.

7. The method of claim 1, wherein determining that the computing device is in a state of current use, further comprises:

detecting activity of motion sensors of the computing device, wherein the plurality of sensors comprises the motion sensors, wherein the motion sensors comprise at least one of an accelerometer and a gyroscope, and wherein the user input data comprises the activity of the motion sensors; and determining that the computing device is in a state of current use, based on the activity of the motion sensors.

8. A computing device, comprising:

a system memory element;

a communication device, configured to establish a communication connection to a plurality of avionics onboard an aircraft and to receive avionics data via the communication connection;

a plurality of sensors, configured to receive user input data indicating use of the computing device;

a display device, configured to present user alerts comprising at least one of graphical elements and text; and at least one processor, communicatively coupled to the system memory element, the communication device, the plurality of sensors, and the display device, the at least one processor configured to:

identify a status of the aircraft, based on continuously monitoring the plurality of avionics communicatively coupled to the computing device via the communication device;

determine that attention of a flight crew member is required by one of the plurality of avionics, based on the status of the aircraft;

determine that the computing device is in a state of current use, based on the user input data received by the plurality of sensors;

present an alert associated with the status and the one of the plurality of avionics, via the display device, wherein the alert comprises an indication to direct the attention toward the one of the plurality of avionics and details associated with the status;

identify a second status of the aircraft from the plurality of avionics, wherein the second status indicates that the one of the plurality of avionics continues to require the attention of the flight crew member;

determine that the flight crew member is not authorized to operate the computing device, based on the second status; and present a second alert indicating that the flight crew member is not authorized to operate the computing device.

9. The computing device of claim 8, wherein the at least one processor is further configured to:

retrieve avionics data associated with the status of the aircraft, via the communication connection; and determine that the attention of the flight crew member is required, based on the avionics data.

10. The computing device of claim 9, wherein the at least one processor is further configured to:

continuously monitor the plurality of avionics, via the communication device, by continuously retrieving updated avionics data throughout a flight; and continuously identify the status of the aircraft, based on continuously monitoring the plurality of avionics.

11. The computing device of claim 9, wherein the at least one processor is further configured to determine that attention of the flight crew member is required, by:
recognizing a critical flight situation, based on the avionics data, wherein the status comprises the critical flight situation;
identifying one or more user actions required to correct the critical flight situation; and
determining the attention of the flight crew member is required, based on the critical flight situation and the one or more user actions.

12. The computing device of claim 8, wherein the at least one processor is further configured to determine that the computing device is in a state of current use, by:
detecting a direction of user gaze, by at least one of the plurality of sensors, wherein the user input data comprises the direction; and
when the direction of the user gaze is directed toward the computing device, determining that the computing device is in a state of current use.

13. The computing device of claim 8, wherein the at least one processor is further configured to determine that the computing device is in a state of current use, by:
detecting active use of a touchscreen of the computing device, wherein the plurality of sensors comprises the touchscreen, and wherein the user input data comprises the active use; and
determining that the computing device is in a state of current use, based on the active use of the touchscreen.

14. The computing device of claim 8, wherein the at least one processor is further configured to determine that the computing device is in a state of current use, by:
detecting activity of motion sensors of the computing device, wherein the motion sensors comprise at least one of an accelerometer and a gyroscope, wherein the plurality of sensors comprise the motion sensors, and wherein the user input data comprises the activity of the motion sensors; and
determining that the computing device is in a state of current use, based on the activity of the motion sensors.

15. A non-transitory, computer-readable medium containing instructions thereon, which, when executed by a processor, perform a method comprising:
detecting, by the processor, current use of a mobile computing device by a user, wherein the mobile computing device comprises the processor and the non-transitory, computer-readable medium;
assessing situational context based on situation data obtained via one or more electronic devices communicatively coupled to the processor, wherein the situational context indicates a status of an aircraft, and wherein the one or more electronic devices comprise a plurality of avionics onboard the aircraft;
when the situational context indicates a user attention requirement separate from the mobile computing device, presenting an alert onscreen of a display device, the user attention requirement being associated with at least one of the avionics;
identifying, by the processor, a second status of the aircraft from the plurality of avionics, wherein the second status indicates that the one of the plurality of avionics continues to require attention of the user;
determining that the user is not authorized to operate the computing device, based on the second status; and
presenting a second alert indicating that the user is not authorized to operate the computing device.

16. The non-transitory, computer-readable medium of claim 15, wherein assessing the situational context further comprises:
obtaining the situation data via the one or more electronic devices;
establishing a communication connection with a remote server configured to store a database of context data; and
identifying the situational context by performing a lookup in the database to locate a match for the situation data.

17. The non-transitory, computer-readable medium of claim 16, wherein detecting the current use of the mobile computing device further comprises:
detecting a direction of user gaze, by at least one of a plurality of sensors communicatively coupled to the processor; and
when the direction of the user gaze is directed toward the mobile computing device, determining that the mobile computing device is in a state of current use.

18. The non-transitory, computer-readable medium of claim 16, wherein detecting the current use of the mobile computing device further comprises:
detecting active use of a touchscreen of the mobile computing device, by at least one of a plurality of sensors communicatively coupled to the processor; and
determining that the mobile computing device is in a state of current use, based on the active use of the touchscreen.

* * * * *